(12) United States Patent
Bera (10) Patent No.: US 7,073,166 B2
(45) Date of Patent: Jul. 4, 2006

(54) CONFORMANCE OF COMPUTER PROGRAMS WITH PREDETERMINED DESIGN STRUCTURES

(75) Inventor: Rajendra K. Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/303,381

(22) Filed: Nov. 25, 2002

(65) Prior Publication Data

US 2004/0103402 A1    May 27, 2004

(51) Int. Cl.
*G06F 9/44* (2006.01)
*G06F 9/45* (2006.01)

(52) U.S. Cl. .................................. 717/130; 717/158
(58) Field of Classification Search ................ 717/130, 717/131, 154, 155, 156, 157, 158, 133
See application file for complete search history.

(56) References Cited

U.S. PATENT DOCUMENTS

| | | | |
|---|---|---|---|
| 5,778,212 A * | 7/1998 | Dehnert et al. ............. | 717/155 |
| 5,828,883 A * | 10/1998 | Hall ............................ | 717/133 |
| 5,838,977 A * | 11/1998 | Gupta ........................ | 717/156 |
| 5,987,254 A * | 11/1999 | Subrahmanyam ............ | 717/155 |
| 6,070,009 A * | 5/2000 | Dean et al. .................. | 717/130 |
| 6,092,180 A * | 7/2000 | Anderson et al. ........... | 712/200 |
| 6,424,120 B1 * | 7/2002 | Chen .......................... | 320/125 |
| 6,425,120 B1 * | 7/2002 | Morganelli et al. ......... | 717/109 |
| 6,425,121 B1 * | 7/2002 | Phillips ...................... | 717/109 |
| 6,519,765 B1 * | 2/2003 | Kawahito et al. ........... | 717/127 |
| 6,636,905 B1 * | 10/2003 | McNamer et al. ............ | 710/15 |
| 6,665,866 B1 * | 12/2003 | Kwiatkowski et al. ...... | 717/159 |
| 6,715,139 B1 * | 3/2004 | Kodosky et al. ............ | 717/125 |
| 6,721,941 B1 * | 4/2004 | Morshed et al. ............ | 717/127 |
| 6,782,374 B1 * | 8/2004 | Nichols ....................... | 706/45 |
| 6,848,100 B1 * | 1/2005 | Wu et al. .................... | 717/157 |
| 6,901,582 B1 * | 5/2005 | Harrison ..................... | 717/127 |
| 6,915,509 B1 * | 7/2005 | Chkodrov et al. .......... | 717/124 |

OTHER PUBLICATIONS

"A Prototype System For Static and Dynamic Program Understanding", David P. Olshefski et al, IBM Watson Research Center, IEEE, 1993, pp. 93-106.*
"Interprocedural Reaching Definitions in the Presence of Single Level Pointers", Hermant D. Pande et al, Rutgers University, Oct. 13, 1992, pp. 1-30.*
Wolfe, M, High Performance Compliers for Parallel Computing, Addison-Wesley, 1996, p. 56.

* cited by examiner

*Primary Examiner*—Todd Ingberg
(74) *Attorney, Agent, or Firm*—Anthony V. S. England; T. Rao Coco (57) ABSTRACT

The present invention discloses a method of developing a software system. The method facilitates the task of checking the software system's conformity to design during development, testing, and maintenance. A design control flow graph describes how the software system is to operate. Coding of the software system proceeds with reference to the design control flow graph. The design control flow graph can also be used as a framework for the construction of a monitoring module that comprises a collection of functions for checking the coding of the software system. During development, each node in the software system executes a corresponding monitoring function of the monitoring module. The monitoring function verifies, for example, whether the node was entered from a valid predecessor node, and whether some or all variables visible to the node have permissible values.

17 Claims, 6 Drawing Sheets

CONFORMANCE OF COMPUTER PROGRAMS WITH PREDETERMINED DESIGN STRUCTURES

FIELD OF THE INVENTION

The present invention relates to conforming computer programs with predetermined design structures.

BACKGROUND

Large software system projects have a relatively high probability of failure, as reported in Jones, C, *Patterns of Software System Failure and Success*, International Thomson Computer Press, London, 1996. Jones analyzes the various reasons why and how software projects fail, but does not offer practical tools that may be used to avoid project failure.

Further, testing of software in large software projects is also a difficult task. While techniques exist for testing large software systems, these techniques have various associated implementations problems.

Design documents are typically prepared for large software system projects. Actual coding commences with reference to such design documents and such documents are cross-referenced during coding. This general approach assists in managing large projects, but is not wholly or universally satisfactory.

Despite the use of various procedures, many software systems develop serious problems during development. Accordingly, a need clearly exists for improved techniques for designing, testing and maintaining software systems.

SUMMARY

A technique is described herein by which software systems can be developed to conform to their intended design. Furthermore, the described technique eases the task of monitoring and modifying a software system during code testing and maintenance.

A design control flow graph (design-CFG) describes how the software system is intended to operate. The design-CFG comprises nodes, between which transitions occur along specified directed edges. Each node, in turn, can comprise a "sub" design-CFG, in a nested manner. Coding of the software system proceeds with reference to the design-CFG.

During development of the software system, code corresponding to each node in the design-CGF is produced, and such a code is called the node's code. Each node's code is augmented with additional code to facilitate the monitoring of the software system during execution to ascertain conformity with design. Whenever a node is entered and before the node's code is executed a call is made to a corresponding node monitoring function. The node monitoring function verifies, for example, whether the node was entered from a valid predecessor node along a valid edge, and whether some or all inherited variables used in the node have permissible values.

DETAILED DESCRIPTION

The described techniques involve three parts, each of which is noted directly below.
 A design control flow graph (design-CFG) derived from the design documents of a proposed software system. In the present context, the design-CFG is assumed to be provided.
 A software system constructed on the basis of the design-CFG.
 A monitoring module that can monitor conformity of the software system with the given design-CFG.

Design-CFG

Figure 1:
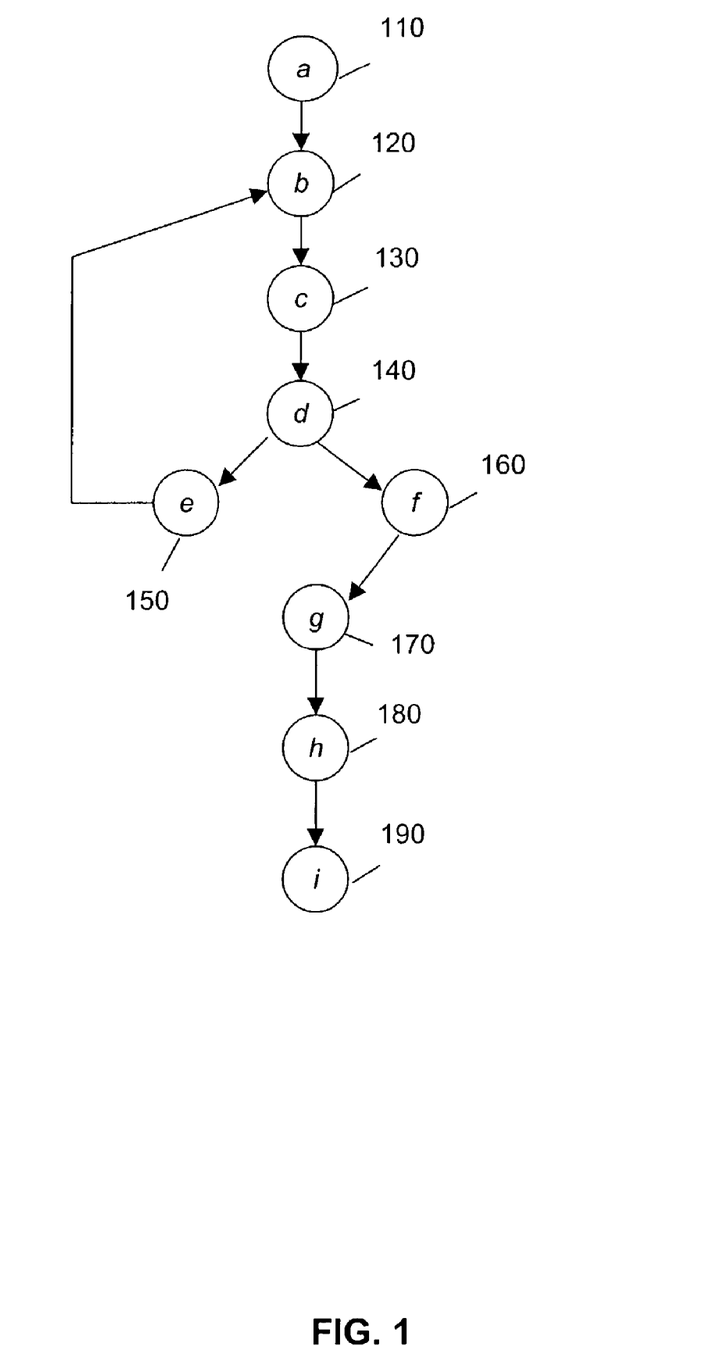
FIG. 1 is an example control flow graph (CFG) of a type that can be used as a predetermined design structure for a software system.

A typical example of a control flow graph is shown in FIG. 1. A characteristic feature of a CFG that distinguishes the CFG from other directed graphs is the presence of a unique source node, called Entry. All other nodes in the CFG are reachable from the Entry node.

A CFG is denoted as the tuple (V, E, Entry) where V is a set of nodes, E is a set of directed edges, and Entry is a source node such that:
 <V, E> is a directed graph (or multigraph)
 Entry $\in$ V is a unique source node
 all nodes are reachable from Entry: ($\forall$ v $\in$ V) [Entry *$\rightarrow$ v]

FIG. 1 is an example of a control flow graph. The graph of FIG. 1 comprises nodes a 110 to i 190. Transitions between nodes, as represented in FIG. 1, are allowed only along the edges. Node a 110 is the Entry node.

More generally, the symbol X *$\rightarrow$ Y indicates that there is a path from X to Y, though this path may be a trivial path if X=Y. In this respect, refer to Wolfe, M, *High Performance Compilers for Parallel Computing*, Addison-Wesley, 1996, Chapter 3, for a relevant discussion. The contents of this reference are hereby incorporated by reference.

Each node in the CFG of FIG. 1 represents a basic block. Each basic block is a sequence of (zero or more) instructions. Each basic block has no branch instructions, except perhaps the last instruction in the block. Also, there are no branch targets or labels, except perhaps at the first instruction in the block. Each basic block corresponds to a linear sequence of statements, a single statement, or even an individual operation. Each edge in a CFG represents a potential flow of control between basic blocks. A conditional branch is represented by a node with two or more graph successors.

A sub-CFG is a subgraph of a CFG with the same properties as a CFG. That is, a sub-CFG has a set of nodes and edges, with a unique entry node, such that all other nodes in the sub-CFG are reachable from the entry node.

In a design-CFG, a node usually represents something more complex than a basic block. Here an instruction can be a high-level statement of intent or a block of pseudo-code, which can include branch instructions or one or more operations. In particular an instruction can represent an operation that, in turn, is represented by a sub-design-CFG. Thus, the design-CFG can be expressed at different levels of granularity defined by the level of details its nodes possess. At some levels of granularity, the human mind perceives an optimal blend of detail and form which makes the software system corresponding to a given design easy to comprehend. At these levels, the design-CFG can also be used as a structural "skeleton" for the construction of the software system and the monitoring module. The software system and monitoring module are both described in further detail below.

Construction of Software System

The construction of the software system requires a systematic adherence to the design-CFG. Each node in the design-CFG has a node id, which in FIG. 1 is represented by a single letter (for example, d 140). For each node in the design-CFG there is a corresponding node in the software system. The code corresponding to a node in the design-CFG is created and placed in the corresponding node in the software system, preferably, with the help of an editor application.

The editor application uses the design-CFG and, for each node of the design-CFG, prompts the software system developer to create what is referred to as the node's code. The editor application also provides some predefined code fragments on its own based on information the editor application culls from the design-CFG as is evident in the examples presented in Tables 1 and 2. Alternatively, the developer can select nodes at will in the design-CFG and, through the editor application, create the node's code for each such selected node.

Figure 2:
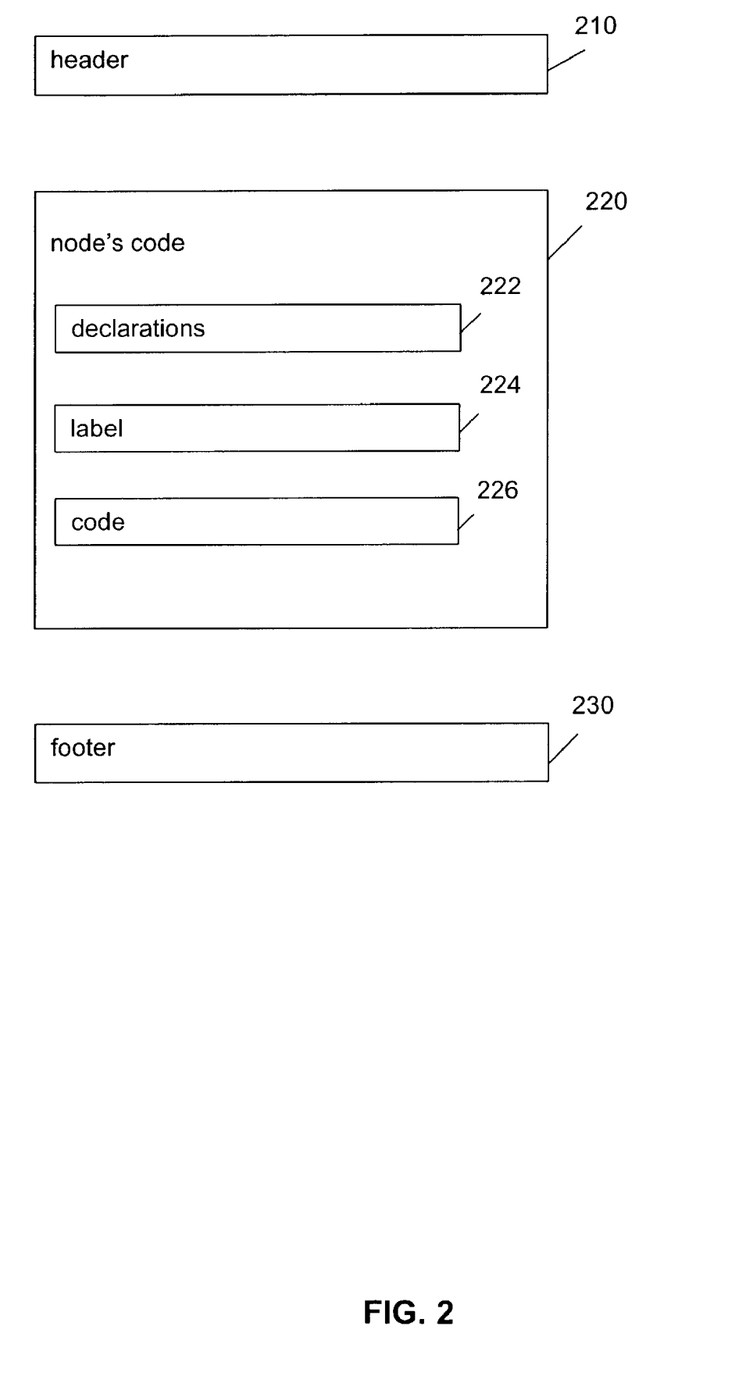
FIG. 2 is a schematic representation of statements that comprise each node of the CFG of FIG. 1.

FIG. 2 schematically represents the statements that comprise a node in the software system.

The header 210 and footer 230 contain the node's id that marks the beginning and end of the node's code 220. Optionally, the header 210 and footer 230 contain further information for monitoring the node's activity.

Headers and footers, for example, can be specially formatted comments, such as, // begin node id and // end node id.

The editor application permits the node's code to be placed between the header 210 and footer 230 of the node. If the node being edited has more than one successor node, then the editor application prompts the user to provide branching instructions for each successor node. As a further aid, the editor application provides a list of successor nodes, and the respective condition values (for example, true or false) associated with each of the edges going from the node to the successor nodes.

If the node being edited has only one successor node, the editor application provides a "goto" statement for transiting to the successor node. If the node being edited is a terminal node (that is, it has no successor node), then the editor application provides an "end" statement in place of a "goto" statement.

Following the header (and comments, if any), each software system node carries:

one or more declarations 222, if required a label 224, which is preferably the node's id code 226

The label is provided so that errors originating in a node can be identified and associated with the node in resulting error messages. The label is also provided as a means for transferring control from one node to another. All statements and labels supplied by the editor application can be highlighted and made non-editable, if required.

If a node of the design-CFG represents a sub-design-CFG (such a node is referred to as a sub-design-CFG-node), then editing control is transferred to the entry node of the sub-design-CFG. When sub-design-CFG editing is concluded, control returns to the sub-design-CFG-node. Sub-design-CFGs can be nested. An incompletely edited node or an empty node can be provided with an "incomplete node code" message through an appropriate option in the editor application, and this message can be displayed, for example, whenever an attempt is made to execute the node's code.

If code placed in a node contains a branch instruction to another node that is not a successor node, the editor application highlights that branch instruction and generates a suitable error message citing the offending another node. This provision prevents inadvertant creation of spurious edges between nodes in the software system.

EXAMPLES

As a first example a generic skeleton for a node X (represented by node id X below) in the software system, with only one (or no) successor node, is provided in Table 1.

TABLE 1

```
// begin node X
// Place comments, if any, on what the node is expected to
// do, below this line.
// For example, these can be the contents of the
// corresponding node in the design-CFG. An alternative can
// be to provide the same information through a scrollable
// window handled by the editor application.
// Place declarations, if any, having internode scope, below
// this line.
... ... ... ...
X:
if (node_X(...) == NA) Msg_to_continue( );
// Provide the node's code below this line.
... ... ... ...
... ... ... ...
... ... ... ...
Make_check_string("Y", NA);
goto Y;   // Replace by "end" if node X is a terminal node.
// end node X
```

In Table 1, Y (represented by its node id Y above) is the node to which control flows from node X. The portions that appear in bold typeface are expected to be generated by the editor application. The portions in regular (that is, not bold) typeface and not commented are provided by the developer. Comments in regular (that is, not bold) typeface are advisory notes intended for the benefit of the developer and can be displayed as help text.

As a second example, a generic skeleton for a node X (represented by its node id X below) in the software system, with more than one successor node, is as set out in Table 2.

TABLE 2

```
// begin node X
// Place comments, if any, on what the node is expected to
// do, below this line.
// For example, these can be the contents of the
// corresponding node in the design-CFG. An alternative
// can be to provide the same information through a
// scrollable window handled by the editor application.
// Place declarations, if any, having internode scope, below
// this line.
```

TABLE 2-continued

```
... ... ... ...
X:
    if (node_X(...) == NA) Msg_to_continue( );
    // Provide the node's code below this line.
    ... ... ... ...
    ... ... ... ...
    ... ... ... ...
    // Place branch instructions to successor nodes
    // below this line. To see successor nodes, press F1.
    // For example,
    if (cond_1) {Make_check_string("Y1", .); goto Y1;}
    else if (cond_2) {Make_check_string("Y2", .); goto Y2;}
    ... ... ... ...
    ... ... ... {Make_check_string("Yi", .); goto Yi;}
    ... ... ... ...
    else {Make_check_string("Yn", .); goto Yn;}
    // end node X
```

In Table 2, Y1, Y2, ... Yn (represented by their respective node ids Y1, Y2, ... Yn above) are the nodes to one of which control flows from node X, depending upon which condition is satisfied. The conditions cond_1, cond_2, ... are derived from the design-CFG. If a corresponding "goto Yi" does not appear for each of Y1, Y2, ... Yn, then the editor application issues an error message for the missing "goto Yi".

The "goto Yi" style of writing branch instructions is used in the above-described example for convenience, however, alternatives, such as the switch-case statement in C programming language can also be used.

The function node_X ( . . . ) is the node monitoring function corresponding to node X of the design-CFG (or equivalently, node X of the software system). This function can return one of three values: True (t), False (f), or Not Applicable (NA). An implementation of node_X ( . . . ) is provided in the subsection below entitled "Monitoring module". The ellipses are placeholders for parameter declarations of the inherited variables which are used within the node's code. These inherited variables are culled from the design-CFG and inserted by the editor application. The function Msg_to_continue( ) provides a predefined message, such as "continuing with user modified data" to indicate that the execution of the node's code is proceeding using new user specified data instead of erroneous data transmitted to the node. The function Make_check_string( ) is also described below in the subsection entitled "Monitoring module".

In the examples of Tables 1 and 2, a liberal use of labels and goto statements may appear unusual. However, this simple format clearly indicates control flow and provides visible means of determining conformance with the design-CFG.

Once code for each node is provided, simple code optimization eliminates many of the labels and goto statements in the production version of the software system. For example, labels that are never referenced can be eliminated. Similarly, goto statements that direct flow of control to the statement immediately after the goto statement can also be eliminated. Other optimization steps, as would be apparent to one skilled in the relevant art, can also be implemented.

Monitoring Module

The monitoring module is a collection of functions, which is preferably created separately from the software system. The functions of the monitoring module have a one-to-one correspondence with the nodes of the design-CFG (and therefore with the nodes of the software system).

Consequently, the editor application that is used to create the software system can also be used to create a monitoring function for each node. Preferably, each node monitoring function is named after its respective node's id (or some mapped version of the node's id), and all the inherited variables used in the node's code are passed as parameters to the function.

Furthermore, for each node X, information regarding the node ids (for example, $W_1, W_2, \ldots W_m$) of all those nodes in the design-CFG from which an edge is directed to node X, along with the respective condition value attached to each such edge, if any, can be automatically generated and provided in a declaration statement in the monitoring function for node X. A small number of global variables, preferably saved in a reserved part of the computer's memory at run-time, can keep track of, for example, the source node, the destination node, condition value of source-to-destination edge as the software sysem executes.

By way of example, assume that the following global variables are accessible to both the software system and the monitoring module: source_node, destination_node, edge_value, and check_string.

As the software system prepares to exit node X to go to node Y along the edge XY with condition value v, it fills in the values of destination_node and edge_value, and creates the check_string "X(v)" if v is true or false, or "X" if v is not applicable. The function Make_check_string( ) provided below in Table 3 shows one way of how this can be done.

TABLE 3

```
void Make_check_string (node Y, edge v)
{
    destination_node = Y;
    edge_value = v;
    if (v == NA) check_string = "X";
    else check_string = "X(v)";
    return;
}
```

As node Y is entered, the monitor function for node Y first checks if the check_string matches with a string in the array prenodes[]. If a match is not found, an error message such as "Invalid entry into node Y from node X occurred" is displayed and execution of the software system is terminated. If a match occurs, then source_node is set to Y, destination_node is set to null, edge_value is set to not applicable, and check_string is set to a null string, indicating that node Y is currently being executed. The function is_from_node (char *prenodes[]) provided in Table 4 below shows one way of how this can be done.

TABLE 4

```
void is_from_node (char *prenodes[])
{
    int i = 0, valid_node = FALSE;
    while (*prenodes[i] && !valid_node)
        if (!strcmp(check_string, prenodes[i++]))
            valid_node = TRUE;
    if (!valid_node) {
        Msg("Invalid entry into node Y from node X occurred.");
        Terminate_program( );
    }
    source_node = Y;
    destination_node = NULL;
    edge_value = NA;
    check_string = "";
    return;
}
```

A typical monitoring function corresponding to a node Y in the design-CFG is provided in Table 5 below.

TABLE 5

```
int node_Y(inherited variables used in node Y)
{
    char* prenodes[] = {"X1(.)", "X2(.)", ..., "Xm(.)", ""};
    int in_err = FALSE, new_vals;
    is_from_node(prenodes); // Omit if Y is an entry node.
Y:
    // Provide code for error detection and error messages
    // below.
    // For example,
    if (!check_1) {in_err = TRUE; Msg (error msg_1);}
    if (!check_2) {in_err = TRUE; Msg (error msg_2);}
    ... ... ... ...
    if (!check_r) {in_err = TRUE; Msg (error msg_r);}
    // On error, (optionally) provide user interface code
    // for changing values of inherited variables used in
    // this node's code.
    // For example,
    if (in_err) { // GetNewVals( ) returns TRUE or FALSE.
        new_vals = GetNewVals(inherited vars used in node Y);
        if (new_vals) {
            in_err = NA;
            goto Y; // To check that the new values are OK.
        }
    }
    if (in_err == TRUE) Terminate_Program( );
    return in_err;
}
```

In the code fragment of Table 5, node_Y( ) is the monitoring function's name for node Y, and in_err can be True (t), False (f), or Not Applicable (NA). When in_err=TRUE, the function Terminate_Program( ) is executed. The task of this function is to "cleanly" terminate the execution of the software system.

The is_from_node( ) function checks if the node was entered from a legitimate predecessor node along a legitimate edge. If the check fails, it gives an error message and calls the function Terminate_Program( ), otherwise returns control to the function node_Y( ), which then checks if the returned value is Not Applicable or not and acts accordingly.

The is_from_node( ) function is not called if the node monitoring function corresponds to an entry node since the entry node does not have a predecessor node. Consequently, the declaration char* prenodes[] is also not created.

When the return value is Not Applicable, the node code is executed with new user-specified values. GetNewVals( ) is a developer-specified function that solicits new values from the user for one or more of the variables listed in the parameter list of the monitor function.

The statement char* prenodes[]={"X1(.)", "X2(.)", ... "Xm(.)", ""}; provides an array of node ids $X_1$, $X_2$, ... $X_m$ from each of which node Y receives an edge. The final null string "" in the array prenodes[] is used to delimit the array. The node ids are appended with the sub-string "(.)" where the dot inside the parentheses is replaced by the applicable edge condition value. For example, "Xi(t)" indicates that the node Y can be reached from node Xi only if the relevant conditional statement in node Xi is evaluated as True, (t). If node Y can be reached from node X, without requiring any condition value (for example, when Y is the only successor node of a node $X_i$), then the sub-string "(.)" is dispensed with altogether and the string written as "Xi".

The list of inherited variables provided to a monitor function can be determined at the design stage. When the software system is complete, an analysis of the software system and its symbol table indicate if those listed variables (with proper scoping) are indeed available or not to the node.

Conceptually, the monitoring module permits error checking code, which is required to verify that a node in the software system has correct inputs at run-time, to be written separately from the node's code in the software system.

Once the software system is tested, or there is no longer any need for the software system to be monitored, the software system can be run independently of the monitoring module by simply commenting out all statements containing calls to the monitoring functions, that is, by commenting out all statements of the form "if (node_X( . . . )==NA) Msg_to_continue( ) from the software system. In addition, all calls to the function Make_check_string( ) must be commented out.

The main purpose of each function in the monitoring module is thus to ensure that the corresponding node in the software system is correctly entered. Correct entry ensures, for example, that the parameter values passed from one of a legitimate set of predecessor nodes along a correct edge are valid in terms of value, range, etc. Thus, most of the error checking that is needed to validate the software system can be done through these functions, rather than in the actual nodes of the software system. Separation of tasks between the software system and the monitoring module simplifies testing of the software system compared with existing techniques, which are generally ad hoc in nature.

The software system and the monitoring module are preferably coded by separate groups of developers using the same design-CFG. This separation of labor ensures that monitoring is effective and credible. The two groups must, of course, agree to work with a common set of variable names (including their scopes) and node ids.

Some of the errors that are detectable are:
1. Incorrect mapping of the design-CFG into the software system.
2. Design changes that are not reflected in either the software system or the monitoring module, or both the software system and the monitoring module.

The software editor application is provided with normal facilities for cutting, copying, pasting, deleting, etc of code fragments. Thus, when a design is changed, these facilities can be used to modify both the software system and the monitoring module.

Observations

During development of the software system, each node in the software system, as soon as the node is entered for execution, first makes a call to the monitoring function corresponding to the node. The function verifies whether the node was entered from a valid predecessor node (if the entered node is not an entry node), and whether some or all inherited variables used in the node's code have permissible values, etc.

The monitoring function issues error messages if errors are detected, in which event the function either: (i) terminates execution of the software system; or (ii) continues processing in consultation with the user, through an appropriately designed interface. If there are no errors, the function returns control to its corresponding node in the software system and executes the node's code.

The monitoring module can be interactive. The monitoring module shares with the software system the following: the design-CFG, the respective list of variables inherited by each node in the design-CFG, and the range, etc of each of such variables. Therefore, each monitoring function can perform whatever checks are needed. These checks do not affect the software system, provided the function does not modify any of the inherited variables passed to the function by the software system through the parameters list or the global variables.

No such modification occurs if the inherited and global variables are treated as read-only variables by the monitoring function. However, when the monitoring function is allowed to change the value of a variable on encountering an error or otherwise, some care in coding may be needed. Changes in values of reserved global variables (such as source_node, destination_node, edge_value, and check_string) are handled exclusively, as a matter of precaution, by the functions Make_check_string( ) and is_from_node( ).

The coding of monitoring functions is relatively straightforward, as this coding mainly involves writing error-checking code and generating error messages. However, if the monitoring module contains interactive functions (that is, functions that allow users to interact with the monitoring module), coding can become relatively complicated, depending upon the interactive features that are provided.

Features can be included that allow the user, when notified of an error, to modify the values of one or more variables, and proceed with the computations using these modified values. Such interactive features permit faster testing and debugging of the software system. Existing program debuggers typically provide such features.

In a production version of the software system, statements containing calls to monitoring functions can be edited out. Alternatively, these statements can be retained as comments, and reactivated only when the code-test flag is reactivated again. Similarly, all calls to the function Make_check_string( ) must be either edited out or commented out.

An Example Design

Figure 3:
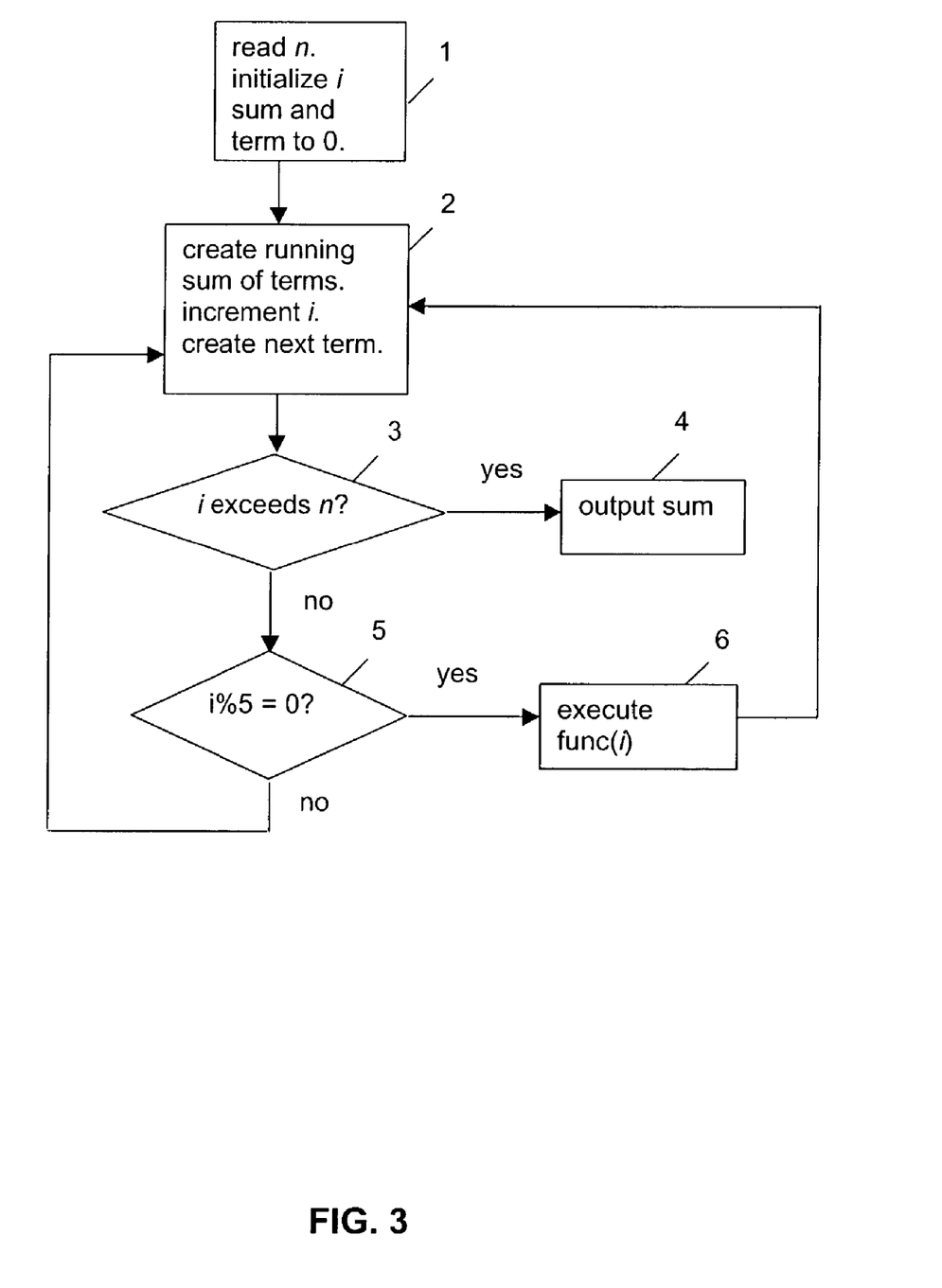
FIG. 3 is a control flow diagram corresponding to an illustrative worked example.

The task to be performed is described as follows. Given that n is a positive integer, sum the first n positive integers, starting from 1, and output the sum. Also, for every fifth integer (5, 10, 15, . . . ) encountered in the summation process, execute the function func(i). FIG. 3 illustrates this task.

The contents of each node of the software system is presented in Table 6. Similarly, the contents of each monitor function is presented in Table 7. The code and functions are written in a "C-like" pseudocode programming language. The pseudocode of Table 6 illustrates one way of filling up node contents for the software system. The pseudocode of Table 7 illustrates one way of creating node monitor functions for the monitoring module. Nodes 1 to 6 referred to in Tables 6 and 7 relate to correspondingly numbered blocks of FIG. 3, which serves as the example's design-CFG.

TABLE 6

```
Node 1
// begin node 1
// Initialize i, sum, term to 0s. Get n.
int i = 0, n = get(n), sum = 0, term = 0;
1:
if (node_1(&n, &i, &sum, &term) == NA) Msg_to_continue( );
Make_check_string("2", NA);
goto 2;
// end node 1
Node 2
// begin node 2
// Create running sum of terms. Increment i. Create next
// term.
2:
if (node_2(&n, &i, &sum, &term) == NA) Msg_to_continue( );
sum += term;
i++;
term++;
```

TABLE 6-continued

```
Make_check_string("3", NA);
goto 3;
// end node 2
Node 3
// begin node 3
// i exceeds n?
3:
if (node_3(&n, &i, &sum, &term) == NA) Msg_to_continue( );
if (i > n) {Make_check_string("4", t); goto 4;}
else {Make_check_string("5", f); goto 5;}
// end node 3
Node 4
// begin node 4
// Output sum on "yes" from node 3.
4:
if (node_4(&n, &i, &sum, &term) == NA) Msg_to_continue( );
put(sum);
Make_check_string("", NA);
end;
// end node 4
Node 5
// begin node 5
// Check if i%5 = 0 on "no" from node 3.
5:
if (node_5(&n, &i, &sum, &term) == NA) Msg_to_continue( );
if (i%5 == 0) {Make_check_string("6", t); goto 6;}
else {Make_check_string("2", f); goto 2;}
// end node 5
Node 6
// begin node 6
// Go to node 2 on "no" from node 5.
6:
if (node_6(&n, &i, &sum, &term) == NA) Msg_to_continue( );
if (i%5 == 0) func(i);
Make_check_string("2", NA);
goto 2;
// end node 6
```

An assumption is made that the software system begins execution from the entry node, which in the above example is node 1.

TABLE 7

```
Node 1 (Entry node)
int node_1(int *n, int *i, int *sum, int *term)
{
    int in_err = FALSE, new_vals = FALSE;
    1:
    if (n < 1) {in_err = TRUE; Msg("'n' must be >= 1");}
    if (i != 0) {in_err = TRUE; Msg("'i' must be 0");}
    if (sum != 0) {in_err = TRUE; Msg("'sum' must be 0");}
    if (term != 0) {in_err = TRUE; Msg("'term' must be 0");}
    // No provision made to get new values from user.
    if (in_err == TRUE) Terminate_Program( );
    return in_err;
}
Node 2
int node_2(int *n, int *i, int *sum, int *term)
{
    char* prenodes[] = {"1", "5(f)", "6", ""};
    int in_err = FALSE, new_vals = FALSE;
    is_from_node(prenodes);
    2:
    if (n < 1) {in_err = TRUE; Msg("'n' must be >= 1");}
    if (i < 1) {in_err = TRUE; Msg("'i' must be > 0");}
    if (sum < 1) {in_err = TRUE; Msg("'sum' must be > 0");}
    if (term < 1) (in_err = TRUE; Msg("'term' must be > 0");}
    if (in_err) {
        new_vals = GetNewVals(n, i, sum, term);
        if (new_vals) {
            in_err = NA;
            goto 2;
        }
    }
    if (in_err == TRUE) Terminate_Program( );
    return in_err;
```

TABLE 7-continued

```
}
Node 3
int node__3(int *n, int *i, int *sum, int *term)
{
    char* prenodes[] = {"2", ""};
    int in__err = FALSE, new__vals = FALSE;
    is__from__node(prenodes);
    3:
    if (n < 1) {in__err = TRUE; Msg("'n' must be >= 1");}
    if (i < 1) {in__err = TRUE; Msg("'i' must be > 0");}
    // No provision made to get new values from user.
    if (in__err == TRUE) Terminate__Program( );
    return in__err;
}
Node 4
int node__4(int *n, int *i, int *sum, int *term)
{
    char* prenodes[] = {"3(t)" , ""};
    int in__err = FALSE, new__vals = FALSE;
    is__from__node(prenodes);
    4:
    if (sum < 1) {in__err = TRUE; Msg("'sum' should be > 0");}
    // No provision made to get new values from user.
    if (in__err == TRUE) Terminate__Program( );
    return in__err;
}
Node 5
int node__5(int *n, int *i, int *sum, int *term)
{
    char* prenodes[] = {"3(f)" , ""};
    int in__err = FALSE, new__vals = FALSE;
    is__from__node(prenodes);
    5:
    // Checks are not considered necessary.
    // No provision made to get new values from user.
    if (in__err == TRUE) Terminate__Program( );
    return in__err;
}
Node 6
int node__6(int *n, int *i, int *sum, int *term)
{
    char* prenodes[] = {"5(t)", ""};
    int in__err = FALSE, new__vals = FALSE;
    is__from__node(prenodes);
    6:
    if (i%5 != 0) {in__err = TRUE; Msg("'i%5' should be 0");}
    // No provision made to get new values from user.
    if (in__err == TRUE) Terminate__Program( );
    return in__err;
}
```

In the above example presented in Table 7, the function GetNewVals(int *n, int *i, int *sum, int *term) in node 2 is assumed to solicit a new value for the variable n, and set i=sum=term=0. If a new acceptable value for n is provided, the function returns the value TRUE, else the function returns the value FALSE.

Overview

Figure 4:
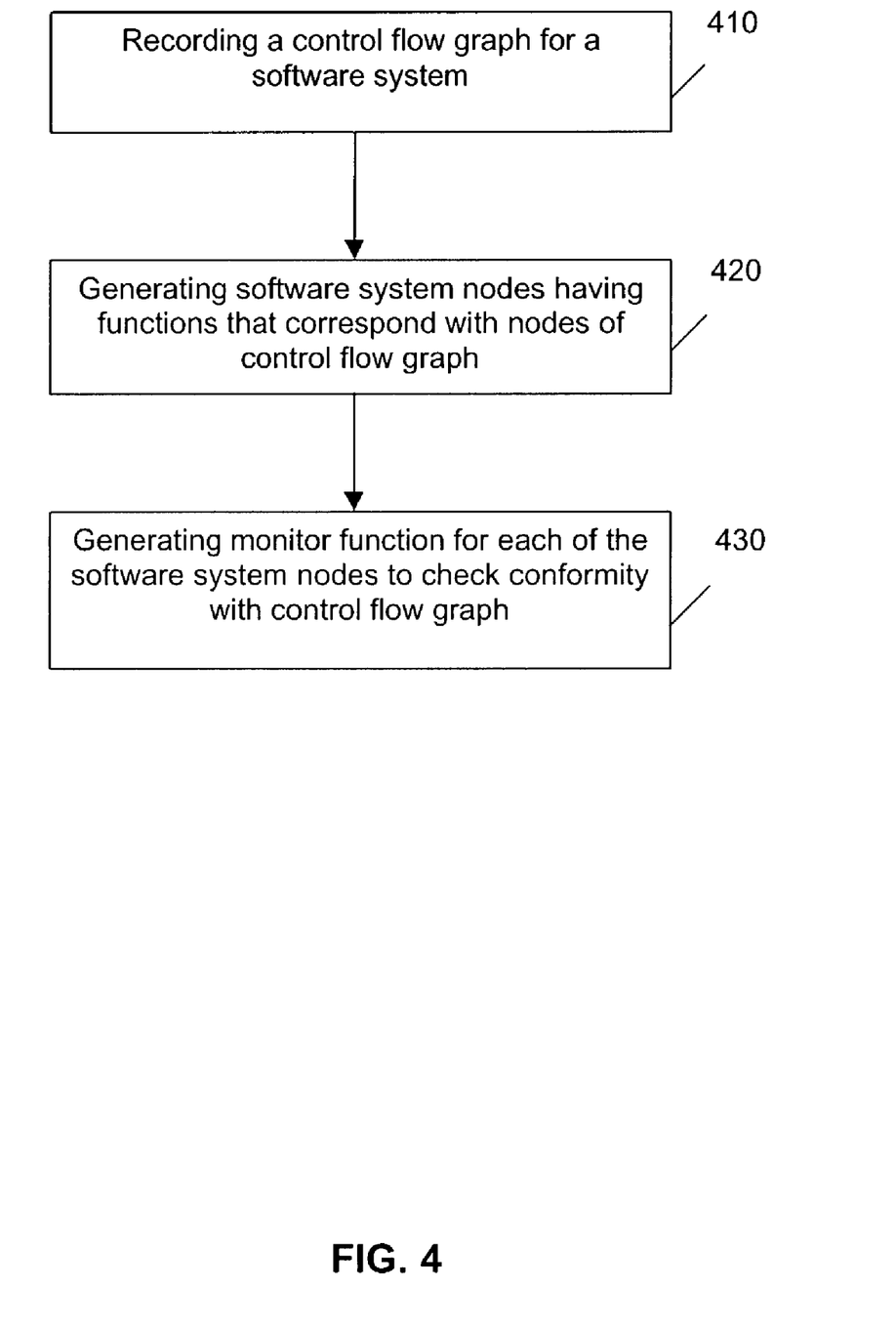
FIG. 4 is a flowchart of steps involved in building a software system with a predetermined design structure that is able to be checked.
Figure 5:
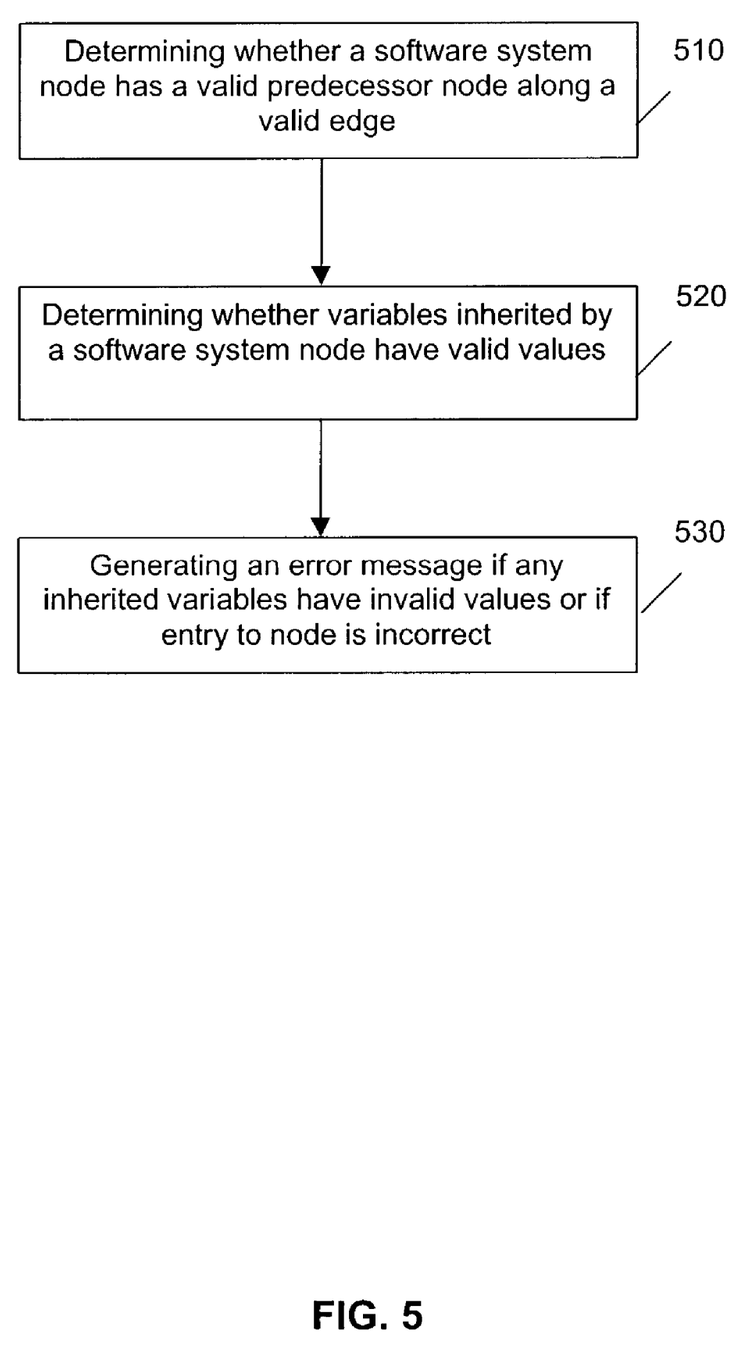
FIG. 5 is a flowchart of steps involved in executing a monitoring function of a software system provided in accordance with FIG. 4.

FIGS. 4 and 5 are flowcharts that each provide an overview of steps involved in (i) providing a system having a predetermined structure that is able to be checked, and (ii) checking the predetermined structure.

FIG. 4 is a flowchart of steps involved in generating a software system having a "self-checking" capability. In step 410, a design-CFG for a software system is recorded. In step 420, a software system is generated. The software system comprises nodes that correspond with nodes of the design-CFG recorded in step 410. In step 430, a monitor function is generated for each of the software system nodes generated in step 420.

FIG. 5 is a flowchart of steps performed by monitoring functions generated in step 430 of FIG. 4. In step 510, a determination is made whether a software system node is reached by a valid predecessor node. In step 520, a determination is made whether variables inherited by a software system node have valid values. In step 530, an error message is generated if any of the inherited variables checked in step 520 have invalid values, or if entry to a node is incorrect.

Computer Hardware and Software

Figure 6:
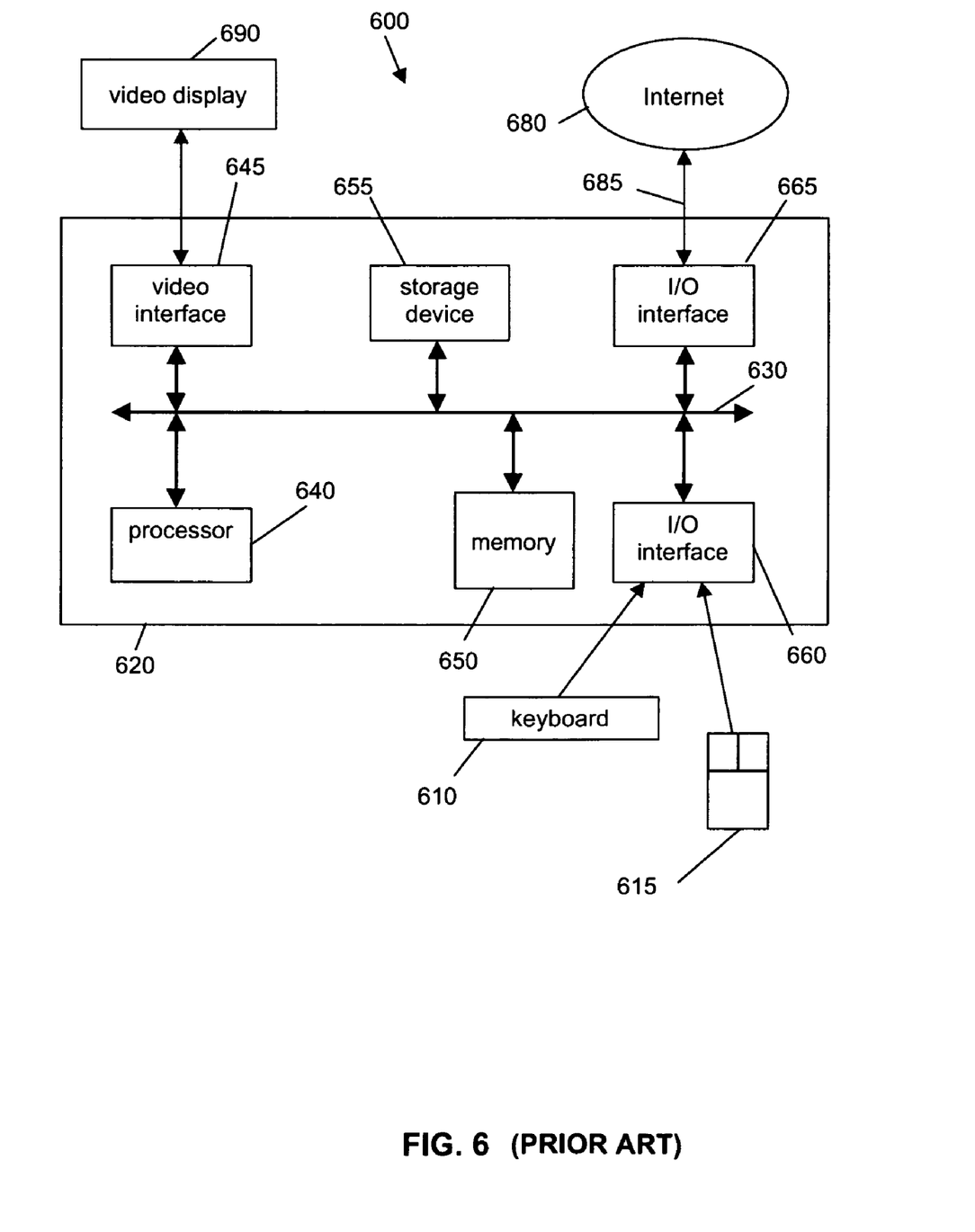
FIG. 6 is a schematic representation of a computer system suitable for performing the techniques described with reference to FIGS. 1 to 5.

FIG. 6 is a schematic representation of a computer system 600 that can be used to perform steps in a process that implement the techniques described herein. The computer system 600 is provided for executing computer software that is programmed to assist in performing the described techniques. This computer software executes under a suitable operating system installed on the computer system 600.

The computer software involves a set of programmed logic instructions that are able to be interpreted by the computer system 600 for instructing the computer system 600 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 600 include: a computer 620, input devices 610, 615 and video display 690. The computer 620 includes: processor 640, memory module 650, input/output (I/O) interfaces 660, 665, video interface 645, and storage device 655.

The processor 640 is a central processing unit (CPU) that executes the operating system and the computer software executing under the operating system. The memory module 650 includes random access memory (RAM) and read-only memory (ROM), and is used under direction of the processor 640.

The video interface 645 is connected to video display 690 and provides video signals for display on the video display 690. User input to operate the computer 620 is provided from input devices 610, 615 consisting of keyboard 610 and mouse 615. The storage device 655 can include a disk drive or any other suitable non-volatile storage medium.

Each of the components of the computer 620 is connected to a bus 630 that includes data, address, and control buses, to allow these components to communicate with each other via the bus 630.

The computer system 600 can be connected to one or more other similar computers via a input/output (I/O) interface 665 using a communication channel 685 to a network 680, represented as the Internet.

The computer software program may be provided as a computer program product, and recorded on a portable storage medium. In this case, the computer software program is accessed by the computer system 600 from the storage device 655. Alternatively, the computer software can be accessed directly from the network 680 by the computer 620. In either case, a user can interact with the computer system 600 using the keyboard 610 and mouse 615 to operate the programmed computer software executing on the computer 620.

The computer system 600 is described for illustrative purposes: other configurations or types of computer systems can be equally well used to implement the described techniques. The foregoing is only an example of a particular type of computer system suitable for implementing the described techniques.

Conclusion

Separate construction of a software system and a closely related monitoring module, each of which is derived from a common design-CFG, facilitates the tasks of testing and maintaining the software system.

A disciplined approach is enforced to software development. The approach ties development firmly to the design-CFG. Indeed, this discipline requires the software system to conform to the intended design through a one-to-one correspondence between the nodes and edges of the software system and those of the design-CFG.

The construction of the software system is such that the coding for each node is performed almost independently. This means that each node's code, treated as a unit, can be placed in arbitrary sequences in the software system with few constraints. One constraint is that all scoping requirements of variables, etc are properly met by any such arbitrary sequence. Preferred sequencing may involve a group of node codes arranged in ascending order of the node ids for easier code viewing and visual search of code fragments.

Since each node's code in the software system is substantially independent, managing code changes (for example, due to design changes) becomes substantially localised and restricted to a group of easily identifiable nodes and monitor functions. This independence and localisation is achieved with the assistance of the design-CFG. If edges between nodes change, and nothing else changes, then only a node's goto X part(s) need to be changed without having to perform significant code revision.

A tool can be provided that scans the software system and with the information contained therein (such as in the headers, footers, branch instructions, etc) generates the design-CFG that applies to the software system. If the generated design-CFG does not match with the given design-CFG, then a mismatch exists. Such a tool can be used to verify that the design is appropriately implemented, at least in principle.

Various alterations and modifications can be made to the techniques and arrangements described herein, as would be apparent to one skilled in the relevant art. For example, the nodes in the design-CFG can be further classified as function entry node, function exit node, etc. Members of each class of node may then be provided with class-specific treatments. By way of example, a node classified as function entry node can be provided with a declaration statement that declares the function's name, the function's parameter types and names, and the type of the result that the function returns. The node classification information can be encoded in the node id.

I claim:

1. A method of coding a software system, the method comprising the steps of:
    a) recording a design control flow graph that represents intended functionality of a software system, the design control flow graph comprising a plurality of nodes between which transitions occur;
    b) generating source code for a software system, the source code comprising a plurality of software system nodes, wherein the source code includes monitoring functions, wherein each software system node has such a monitoring function and corresponds one-to-one with a respective one of said nodes of said design control flow graph, and wherein the design control flow graph is produced before, or at least independently of the source code to specify intended function and structure of the source code; and
    c) executing executable program code corresponding to the source code, wherein the executing proceeds in a sequence such that a first node of the executable program code corresponding to the first one of the software system nodes is exited and a second node of the executable program code corresponding to the second one of the software system nodes is entered from the executable program code's first node, and the executing includes:
        recording indicia of the exiting from the executable program code's first node by the executable program code for the monitoring function of the first software system node; and
        comparing to the indicia, by the executable program code for the monitoring function of the second software system node, a record of valid predecessor nodes from a predecessor array, wherein if the comparing indicates the first software system node is not a valid predecessor to the second software system node, the executable program code for the monitoring function of the second node cleanly terminates the executing and records the entry to the second executable node from the executable program code's first node as not in conformance with the design control flow graph.

2. The method as claimed in claim 1, further comprising the step of:
    generating a record by the executable program code for the first monitoring function of a value of a transition variable that caused the first executable program code's node to stop executing in favour of said second executable program code's software system node.

3. The method as claimed in claim 1, wherein ones of the monitoring functions include source code for determining whether one or more variables of respective ones of said software system nodes have valid values.

4. The method as claimed in claim 1, wherein the comparing in c) includes the monitoring function for the second software system node determining validity of a value that caused said second software system node to be entered.

5. The method as claimed in claim 1, wherein all or portions of contents of said software system nodes and said source code for said monitor functions are automatically generated.

6. The method as claimed in claim 1, wherein such executable program code for a monitor function executes prior to a body of the executable program code for the monitor function's respective software system node.

7. A computer system for determining whether software code conforms with a predetermined design structure, the computer system comprising:
    means for recording a design control flow graph that represents the intended functionality of a software system, the design control flow graph comprising a plurality of nodes between which transitions occur;
    means for generating source code for a software system, the source code comprising a plurality of software system nodes, wherein the source code includes monitoring functions, wherein each software system node has such a monitoring function and corresponds oneto-one with a respective one of said nodes of said design control flow graph, and wherein the design control flow graph is produced before, or at least independently of the source code to specify intended function and structure of the source code; and executable program code corresponding to the source code, the executable program code being recorded on a medium readable by the computer system, wherein the computer system is operable to execute the executable program code, the executing proceeding in a sequence such that a first node of the executable program code corresponding to the first one of the software system nodes is exited and a second node of the executable program code corresponding to the second one of the software system nodes is entered from the first node, and wherein the executing includes:

recording indicia of the exiting from the first node by the executable program code for the monitoring function of the first software system node; and comparing to the indicia, by the executable program code for the monitoring function of the second software system node, a record of valid predecessor nodes from a predecessor array, wherein if the comparing indicates the first software system node is not a valid predecessor to the second software system node, the executable program code for the monitoring function of the second software system node cleanly terminates the executing and records the entry to the second node from the executable program code's first node as not in conformance with the design control flow graph.

8. The computer system as claimed in claim 7, wherein executing the executable program code includes:

generating a record, by the executable program code for the first monitoring function, of a value of a transition variable that caused the executable program code's first node to stop executing in favour of said second executable program code's node.

9. The computer system as claimed in claim 7, wherein ones of the monitoring functions include source code for determining whether one or more variables of respective ones of said software system nodes have valid values.

10. The computer system as claimed in claim 7, wherein the comparing to the indicia includes the executable program code for the monitoring function for the second software system node determining validity of a value that caused said second software system node to be entered.

11. The computer system as claimed in claim 7, wherein all or portions of contents of said software system nodes and said monitor functions are automatically generated.

12. The computer system as claimed in claim 7, wherein such an executable program code for a monitor function executes prior to a body of the executable program code for the monitor function's respective software system node.

13. Computer software, recorded on a medium, for determining whether software source code conforms with a predetermined design structure, the computer software comprising:

software code means for recording a design control flow graph that represents intended functionality of a software system, the design control flow graph comprising a plurality of nodes between which transitions occur;

software source code for a software system, the source code comprising a plurality of software system nodes, wherein the source code includes monitoring functions, wherein each software system node has such a monitoring function and corresponds one-to-one with a respective one of said nodes of said design control flow graph, and wherein the design control flow graph is produced before, or at least independently of the source code to specify intended function and structure of the source code; and executable program code corresponding to the source code, wherein executing the executable program code proceeds in a sequence such that a first node of the executable program code corresponding to the first one of the software system nodes is exited and a second node of the executable program code corresponding to the second one of the software system nodes is entered from the first executable node, and wherein the executing includes:

recording indicia of the exiting from the executable program code's first node by the executable program code for the monitoring function of the first software system node; and comparing to the indicia, by the executable program code for the monitoring function of the second software system node, a record of valid predecessor nodes from a predecessor array, wherein if the comparing indicates the first software system node is not a valid predecessor to the second software system node, the executable program code for the monitoring function of the second executable node cleanly terminates the executing and records the entry to the executable program code's second node from the executable program code's first node as not in conformance with the design control flow graph.

14. The computer software as claimed in claim 13, wherein executing the executable program code includes:

generating a record by the executable program code for the first monitoring function of a value of a transition variable that caused the executable program code's first node to stop executing in favour of said executable program code's second node.

15. The computer software as claimed in claim 13, wherein ones of the monitoring functions include source code for determining whether one or more variables of respective ones of said software system nodes have valid values.

16. The computer software as claimed in claim 13, wherein the comparing of the indicia includes the executable program code for the monitoring function for the second software system node determining validity of a value that caused said second software system node to be entered.

17. The computer software as claimed in claim 13, wherein such an executable program code for a monitor function executes prior to a body of the monitor function's respective software system node.

* * * * *